Oct. 5, 1937.  W. T. BITLER ET AL  2,094,977
ELECTRIC STOCK HEATER
Filed May 24, 1935  4 Sheets-Sheet 2

INVENTORS
William T. Bitler
Morris S. Evans
BY Donald U. Rich
ATTORNEY

Oct. 5, 1937.   W. T. BITLER ET AL   2,094,977
ELECTRIC STOCK HEATER
Filed May 24, 1935   4 Sheets-Sheet 3

INVENTORS
William T. Bitler
Morris S. Evans
BY Donald U. Rich
ATTORNEY

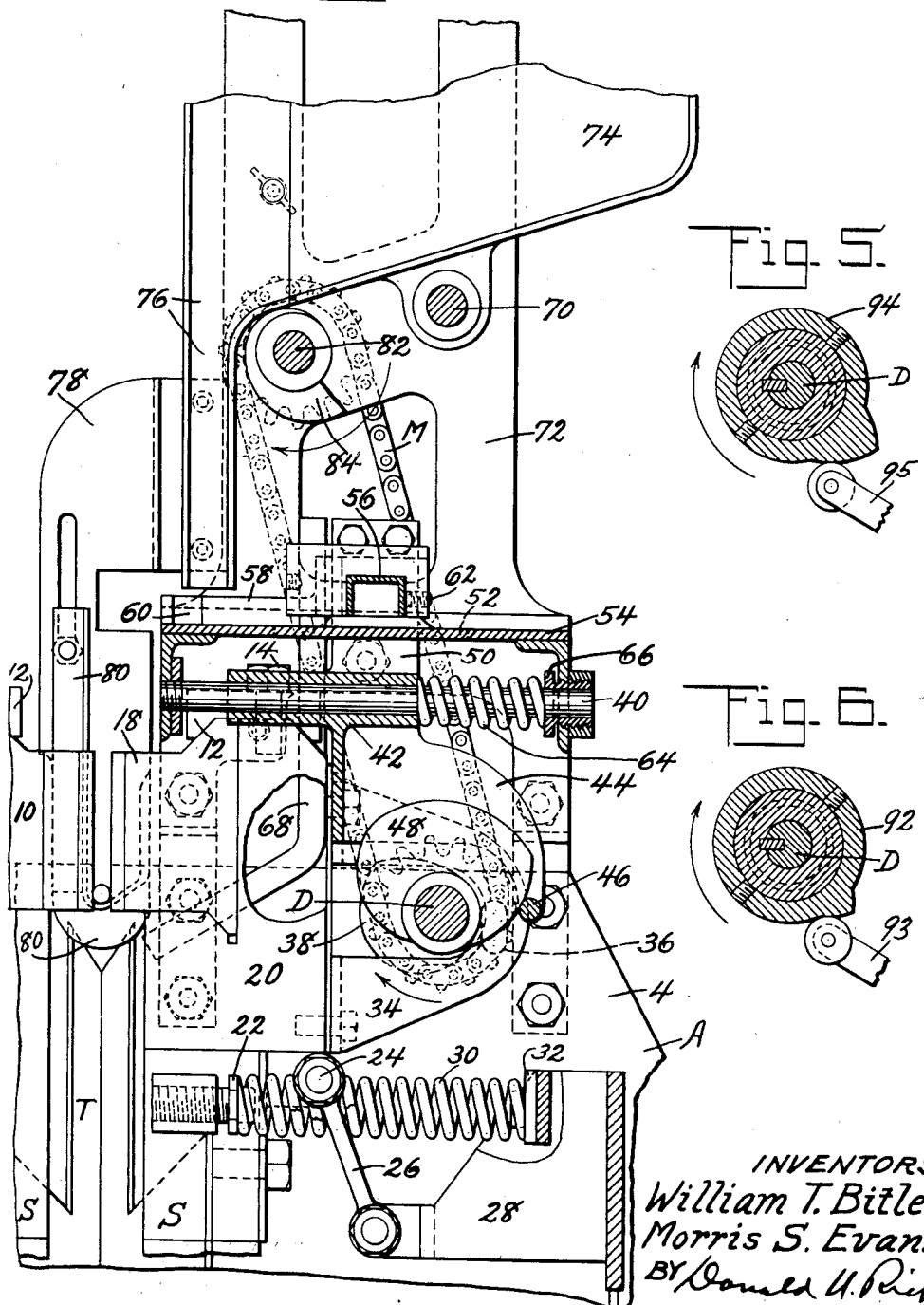

Patented Oct. 5, 1937

2,094,977

UNITED STATES PATENT OFFICE 2,094,977

ELECTRIC STOCK HEATER

William T. Bitler and Morris S. Evans, Berwick, Pa., assignors to American Car and Foundry Company, New York, N. Y., a corporation of New Jersey Application May 24, 1935, Serial No. 23,176

17 Claims. (Cl. 219—11)

This invention relates to electric heaters in general and in particular to electric heaters of the automatic type in which a predetermined heat in the bar is reached regardless of the heating time interval.

Previous rivet or stock heaters have been of either the manual or in a few cases of the so-called automatic type. In the first type the operator performed all functions including that of guessing the temperature of the material being heated and which necessarily caused a large number of improperly heated or burned parts which had to be rejected. In the so-called automatic heaters as previously built the operator guessed at the temperature of one piece and set the machine to repeat a definite cycle in a definite time, but such an arrangement was unsatisfactory due to variations in voltage of the supply, scale on the material or other causes and the number of rejected and damaged parts was as high as with the hand-operated machine.

It is an object of this invention to eliminate the uncertainty of operation and provide a machine in which the material will be heated to a definite predetermined temperature.

It is another object of this invention to provide an automatic machine the cycles of operation of which are controlled by means of light-sensitive means.

A further object of this invention is the provision of a material heating machine which will heat the stock to a definite predetermined temperature.

A still further object of this invention is the provision of a means to positively remove the heated stock from the heating electrodes.

These and other objects of the invention will be apparent to one skilled in the art from a study of the description taken in conjunction with the accompanying drawings in which Figure 1 is a side view of the machine;

Fig. 4 is an enlarged sectional view taken of line 4—4 of Fig. 3 and showing the electrodes closed on a piece of stock;

Figure 1:
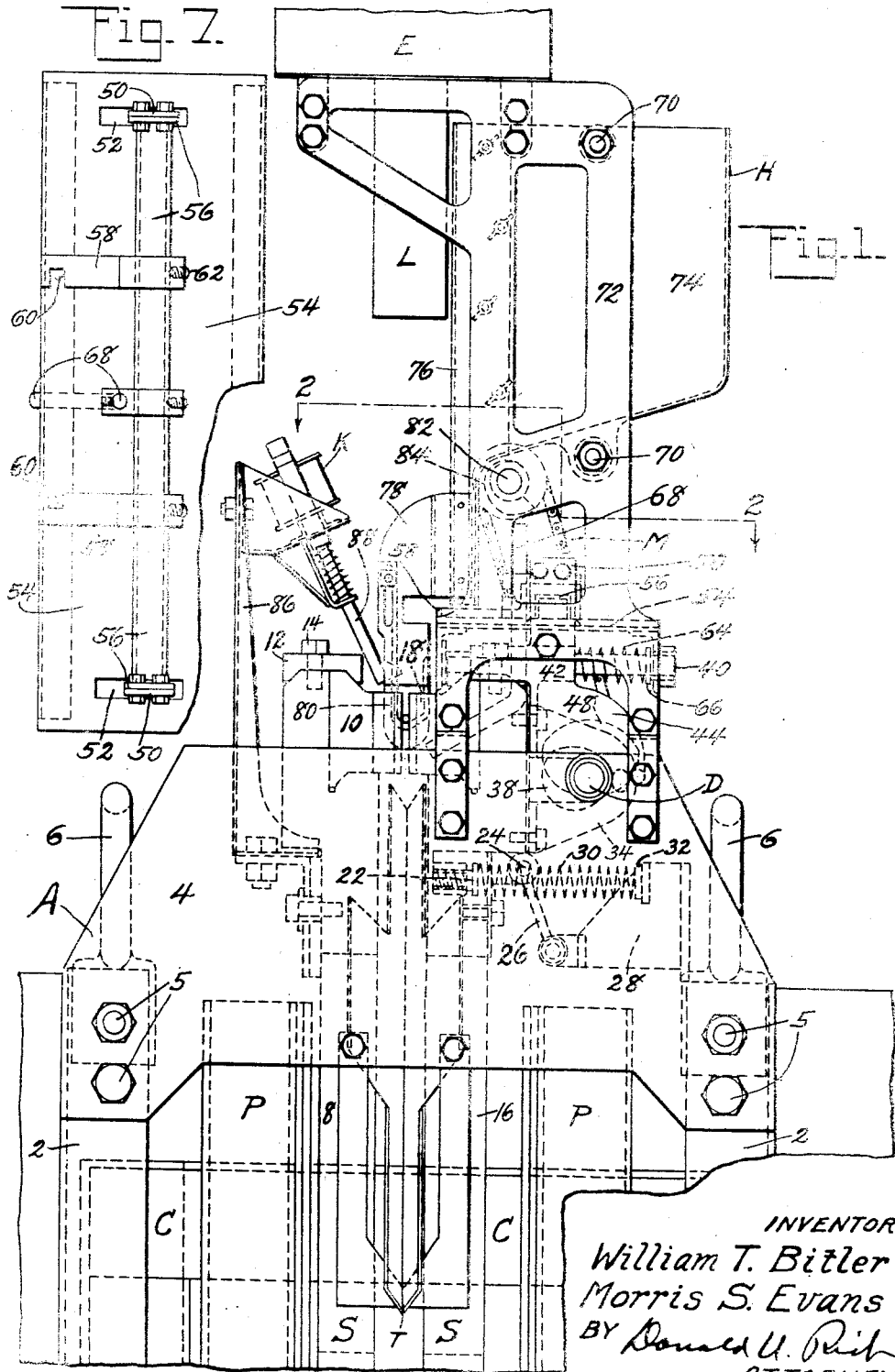
Figure 2:
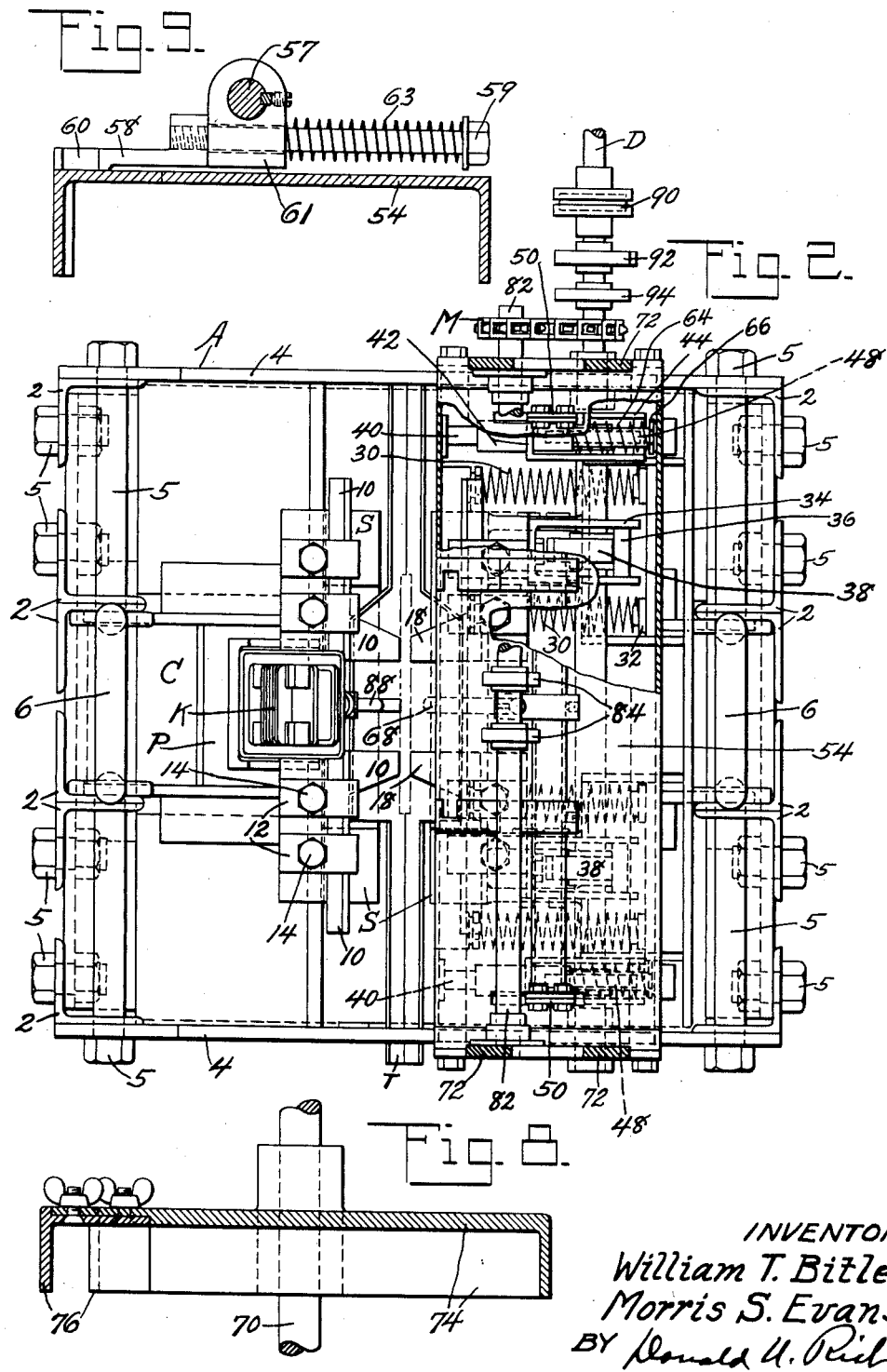
Fig. 2 is a sectional view taken on line 2—2 of Fig. 1.
Figure 3:
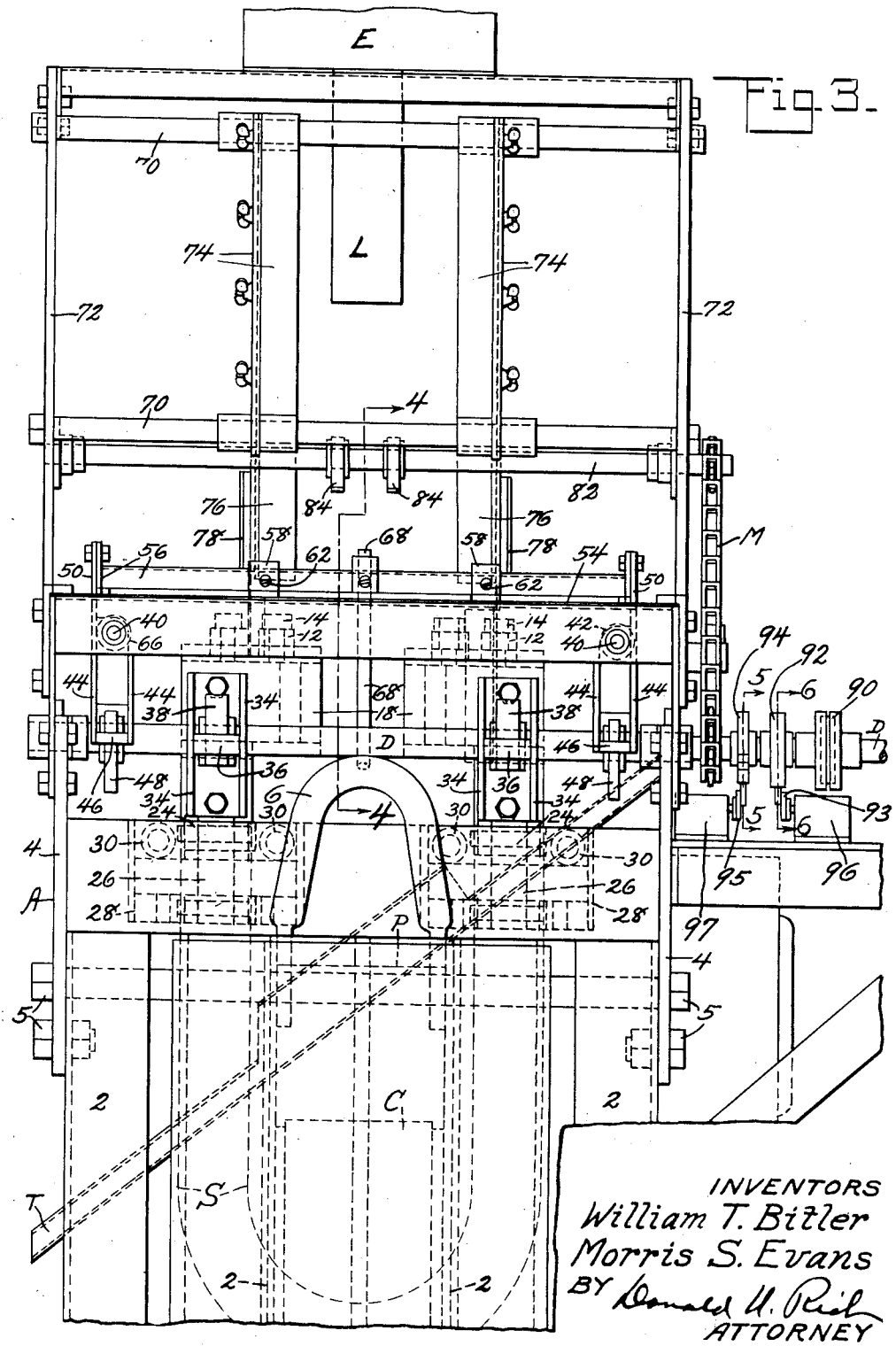
Fig. 3 is a rear view of the machine.

Figs. 5 and 6 are sectional views taken on lines 5—5 and 6—6 of Fig. 3 and show the switch control cams;

Fig. 7 is a plan view of the material pusher and table;

Fig. 8 is an enlarged sectional view of one side of the stock holder or hopper, and Fig. 9 is an enlarged detail of a modified and preferred form of pusher bar.

Referring now to the drawings in which like numerals refer to like parts in the several views it is seen that the heater comprises in general, a suitable frame A in which is positioned the primary coil or coils P, transformer core C and split secondary S. Carried on this frame is hopper H, light-sensitive device E, driven shaft D and kicker solenoid K.

The frame is formed by structural shapes such as angles 2 and plates or bars 4 secured together by bolts or rivets 5, and is provided with lifting loops 6. The laminated and suitably insulated transformer core C, is so positioned as to be clamped between certain of the frame members and has wound on it the primary coils P which may be provided with various taps or resistances in order that the ampere turns of the coil may be varied. The secondary is formed of two U-shaped parts encircling the core and one of which, designated by numeral 8, is rigidly fastened to the frame and provided at its upper or open ends with adjustable electrodes 10, suitably held in their adjusted position by the bars 12 and bolts 14. The other half 16 of the secondary is likewise U-shaped and provided with adjustable electrodes 18 held in adjusted position by bars and bolts similar to those used in holding the electrodes 10. This half of the secondary is movable as a unit and has blocks 20 attached to each leg adjacent the top portion, which blocks are provided with adjustable spring seats 22 in the form of bolts and with ears to receive a bolt 24 supporting the secondary on the swing link 26 pivotally connected to a frame bracket 28. Springs 30 engage the adjustable spring seats 22 and a seat 32 on the frame to constantly urge the movable secondary electrodes toward the stationary electrodes, these springs being aided by the weight of the secondary due to the position and placement of the supporting swing link. A U-shaped bracket 34 is suitably fastened to each block 20 and is provided with an opening in each leg thereof for the passage of shaft D and is also provided at its outer edge with a cam bar 36 adapted to be engaged by a cam 38 fastened to the shaft D. A chute or trough T is attached to the frame between the secondary coils and immediately below the electrodes.

Carried near the upper part of the frame are two or more guide rods 40, each slidably carrying a member 42 having downwardly extending arms 44 joined together by cam rod 46 adapted to be engaged by cam 48 carried on the driven shaft D. Each member is also provided with an upwardly extending projection 50 extending through slots 52 in the top plate or table 54 and these projections are joined by a cross bar 56 of inverted channel form. Pusher bars 58 having opposed notches 60 are adjustably fastened to the channel by set screws 62 and the entire pusher assembly is urged forwardly by compression springs 64 surrounding the guide rods and having one end reacting against adjustable frame stop 66. A vertically and horizontally adjustable support 68 is also carried by the cross bar and is so arranged as to move forwardly with the assembly and temporarily support the material which is to be heated.

In the modification shown in Fig. 9, which is the preferred form, the pusher bars are resiliently carried by the cross bar 57 so that they may move relative to each other in order to prevent breakage of the parts when the cross bar is being returned under action of the cams 48. This resilient connection is accomplished by fastening bolt or rod 59 to the pusher bar and slidably supporting this bolt in the adjustable block 61. A compression spring 63 surrounds the bolt and reacts against the bolt head and adjustable block to resiliently control the pusher bar.

In order that the hopper may carry and feed various sizes of material it is necessary that it be adjustable and this is accomplished by providing bars 70 carried in frame extensions 72, which bars slidably support hopper side frames 74 having solid sides and inturned flanges. Guide members 76 are removably connected to the side frames by bolts and wing nuts and each member is formed with a channel-shaped lower end, the spacing of whose flanges is chosen in accordance with the diameter of the material to be heated. One of the hopper sides carries a bracket 78 on which is adjustably carried a stationary material support 80 adapted to cooperate with the movable support 68 in supporting the material to be heated. It is readily seen that various length material may be accommodated by simply shifting the hopper sides, while various sizes may be accommodated by changing the guide members. An agitating rod 82 carries members 84 so positioned as to move the material in the hopper when the rod is being driven by the shaft D through chain M, this being done to insure proper feeding of the material to the guide members.

The light-sensitive means E is carried in a light-tight container provided with a tube L which may if desired contain lenses to focus the light or radiant energy from the heated material on the light-sensitive bulb for control purposes. Suitable relays, resistances and other control means are provided in order that the light-sensitive means will function at various temperatures determined by the setting of the control means, but since these circuits and controls are not specifically claimed in the present case, further description is unnecessary. The kicker solenoid K is adjustably carried by bracket 86 mounted on the frame and is provided with plunger 88 positioned so as to loosen the material from the electrodes when the solenoid is energized.

The drive shaft D may be driven by an electric motor carried by the frame in any suitable location or position and drives the shaft through flexible coupling 90. Switch control means 92 and 94 are adjustably positioned on the shaft and through switch arms 93 and 95 control switches 96 and 97 suitably connected in the electrical circuit.

Having now described the position and relation of the various parts, the operation of the machine will be described following through a complete cycle of operation, which cycle will repeat indefinitely, since the machine is purely automatic.

Assuming as a starting point that the machine is in the position shown in which a bar of material is gripped by the electrodes and is being heated and in which position no parts are moving. As soon as the bar reaches the temperature for which the controls have been set the light sensitive means functions to shut off the primary current and to start the electric motor rotating the shaft D in the direction indicated by the arrows. Rotation of the shaft causes cams 38 to start moving the electrodes 18 to release the hot material and as soon as they have opened slightly control cam 94 trips switch 97 energizing the solenoid K and releasing the material in order that it may drop into the chute down which it slides to be carried away by the operator or by mechanical means not shown. In the meantime cam 48 has moved the pusher assembly back to a position in which a cold piece of material drops into slots 60 from the guide channel 76, then as soon as the cam bar 46 passes the tip of cam 48 the pusher moves forwardly under action of spring 64 carrying with it the bar of material and the movable support 68. When the pusher notch has passed the edge of the table the material drops by gravity to a position in which one end is supported by the stationary support 80 and the other end or an intermediate part is supported temporarily by movable support 68. In the meantime due to the form of cam 38 the electrodes 18 have remained in the retracted position. They now move forward under action of the springs 30 and as soon as the bar is gripped by the electrodes the pusher table which has started its return movement moves rapidly to its retracted position, leaving the bar gripped by the electrodes. In the meanwhile the cam 92 has been rotating until it is now in the position shown in Fig. 6 in which position a very slight continued rotation trips switch 96 stopping the motor, resetting and turning the control over to the light-sensitive means and turning on the primary circuit. The bar immediately starts to heat, since it completes the circuit of the secondary loop, and as soon as heated the cycle described repeats.

It is readily seen that the light-sensitive means may be set to trip at a definite temperature which may be determined by a pyrometer or other means and that it will then positively control the heating of the material to this temperature irrespective of voltage fluctuations and size, composition or type of material. The operator has therefore, except in emergencies, for which controls are provided, nothing to do except to keep the hopper filled with material and the material will be delivered at a certain desired and predetermined temperature.

Throughout the description various adjustable parts have been referred to without specifically mentioning the purpose of the adjustments, but it is believed that the purpose is so obvious to one skilled in the art that it is unnecessary to elaborate upon the matter; however it might be well to state that these adjustments permit of the heating of any desired portion of the material, the use of the entire electrode face, and the use of varying sizes and lengths of materials. Likewise various forms, positions and arrangements of parts have been described, but it is obvious that other arrangements may be made without departing from the scope of the invention as defined by the following claims.

What is claimed is:

1. In an electric material heater, fixed and movable secondary coils, a material-containing hopper having side portions adjustable in order to accommodate and hold in a central position material of various sizes and lengths, material supports beneath the hopper, means operating to permit the material from the hopper to drop by gravity onto the supports, means causing the movable coil to coact with the stationary coil to grip the material for heating, and means operating to release the grip of said coils upon the material after heating thereof.

2. In an electric material heater, fixed and movable secondary coils, laterally adjustable electrode means on each secondary coil, a material hopper having side wall portions adjustable to accommodate and hold in a central position material of various lengths, said electrode means being adjustable to permit heating of any desired portion or length of material, means operating to permit the material from the hopper to drop by gravity between the electrodes, means causing the electrodes of the movable coil to coact with the electrodes of the stationary coil to grip the material for heating, and means operating to release the material from the electrodes after heating.

3. In an electric material heater, fixed and movable electrodes, a material-containing hopper having portions adjustable to accommodate and hold in position material of various sizes and lengths, means movable to permit material from the hopper to drop by gravity between the electrodes, driven means for operating said movable means, resilient means interposed between said driven and movable means, said resilient means operating to prevent injury of the movable means due to the wedging of material at the hopper outlet, and means causing the electrodes to grip the material for heating.

4. In an electric material heater, fixed and movable electrodes, a material-carrying hopper, means cooperating with the hopper and operating to permit the material from the hopper to drop between the electrodes and power-driven means permitting the electrodes to grip the material independently of the first-named means for heating said material.

5. In an electric material heater, fixed and movable electrodes, a material-carrying hopper having a discharge chute, relatively fixed support means carried by the chute, movable means adjacent the chute, material-support means carried by the movable means, said movable means operating to permit the material from the hopper to drop onto both of said support means and means operating to permit the electrodes to grip the material for heating.

6. In an electric material heater, fixed and movable electrodes, a material-carrying hopper, relatively fixed support means carried by the hopper, movable means adjacent the hopper provided with support means, said movable means operating to permit the material from the hopper to drop onto said support means, means operating to permit the electrodes to grip the material for heating and said supports being adjustable whereby the entire electrode face may be utilized.

7. In an automatic electric material heater, fixed and movable heating electrodes, a material-carrying hopper, spring-operated pusher means adapted to supply material from the hopper to the electrodes for heating, a power-driven shaft, means on the shaft permitting operation of said pusher, said last-named means also controlling said movable electrode, and said electrodes operating to grip the material independently of the pusher means during heating.

8. In an automatic electric material heater, fixed and movable electrodes, a material-carrying hopper, pusher means adapted to supply material from the hopper to the electrodes for heating, a power-driven shaft, control means on said shaft permitting operation of said pusher and movable electrode and additional control means on said shaft adapted to stop the rotation of the shaft during heating of the material.

9. In an automatic electric material heater, fixed and movable electrodes, a material-carrying hopper, pusher means adapted to supply material to the electrodes for heating, means responsive to radiant energy from the heating material, a power-driven shaft, means on said shaft operating said pusher and movable electrode, additional means on said shaft operating to stop the rotation of the shaft, said energy-responsive means operating to start the shaft rotating when the material has reached a predetermined temperature.

10. In an automatic electric material heater, fixed and movable electrodes, a material-carrying hopper, pusher means adapted to supply material to the electrodes for heating, means responsive to radiant energy from the heating material, a power-driven shaft, means on said shaft operating said pusher and movable electrode, additional means on said shaft operating to stop the rotation of the shaft, said energy-responsive means operating to start the shaft rotating when the material has reached a predetermined temperature, and means operating to positively remove the material from the electrodes.

11. In an automatic electric material heater, fixed and movable electrodes, means adapted to supply material to the electrodes, power-driven means operating the electrodes independently of the first-named means to grip the material for heating, and means responsive to radiant energy from the heated material controlling the operation of said first-mentioned means and the release of the material from the electrodes.

12. In an automatic electric material heater, fixed and movable electrodes, means adapted to supply material to the electrodes, means to control the movement of the electrodes, a power device to operate both of said means, means responsive to radiant energy from the heated material and means operating to give control of the heater to the energy-responsive means and power device in sequence.

13. In an automatic electric material heater, fixed and movable electrodes, means adapted to supply material to the electrodes, means to control the movement of the electrodes, a power device to operate both of said means, means responsive to radiant energy from the heated material, means operating to give control of the heater to the energy-responsive means and power device in sequence, and means operative to positively release material from the electrodes.

14. In an electric material heater, fixed electrodes, a movable open circuit coil, electrodes at the terminals of the coil, resilient means urging the electrodes of the movable coil toward the fixed electrodes and power-driven means to separate the electrodes.

15. In an electric material heater, fixed electrodes, a movable open circuit coil, electrodes at the terminals of the coil, link means operative to urge the electrodes of the movable coil toward the fixed electrodes and power-driven means to separate the electrodes.

16. In an electric material heater, fixed electrodes, a movable open circuit coil, electrodes at the terminals of the coil, link and resilient means operative to urge the electrodes of the movable coil toward the fixed electrodes and power-driven means to separate the electrodes.

17. In an electric material heater, fixed electrodes, and a movable open circuit coil, electrodes at the terminals of the coil, link means supporting the coil upon the heater, said link means being inclined toward the coil and the fixed electrodes whereby the electrodes of the movable coil are urged toward the fixed electrodes.

WILLIAM T. BITLER.
MORRIS S. EVANS.